(12) United States Patent
Luo et al.

(10) Patent No.: US 9,351,307 B2
(45) Date of Patent: May 24, 2016

(54) CSI REPORT WITH DIFFERENT RECEIVER CAPABILITIES

(71) Applicant: QUALCOMM Incorporated, San Diego, CA (US)

(72) Inventors: Tao Luo, San Diego, CA (US); Michael Lee McCloud, San Diego, CA (US); Brian Clarke Banister, San Diego, CA (US); Peter Gaal, San Diego, CA (US); Aleksandar Damnjanovic, Del Mar, CA (US); Yongbin Wei, San Diego, CA (US); Hao Xu, San Diego, CA (US); Tingfang Ji, San Diego, CA (US); Siddhartha Mallik, San Diego, CA (US); Alexei Yurievitch Gorokhov, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/639,058

(22) Filed: Mar. 4, 2015

(65) Prior Publication Data

US 2015/0282191 A1 Oct. 1, 2015

Related U.S. Application Data

(60) Provisional application No. 61/973,230, filed on Mar. 31, 2014.

(51) Int. Cl.
*H04W 72/08* (2009.01)
*H04L 5/00* (2006.01)
(Continued)

(52) U.S. Cl.
CPC ........... *H04W 72/082* (2013.01); *H04B 1/7107* (2013.01); *H04B 7/068* (2013.01);
(Continued)

(58) Field of Classification Search
CPC .... H04W 72/082; H04W 24/10; H04B 7/068; H04B 7/0684; H04B 7/0632; H04B 1/7107; H04J 11/005; H04L 1/0026; H04L 5/0048
USPC ................................ 455/452.1, 450; 370/252
See application file for complete search history.

(56) References Cited

U.S. PATENT DOCUMENTS

2009/0209196 A1* 8/2009 Haverty ................... H04K 3/28
455/1
2011/0237270 A1* 9/2011 Noh ..................... H04B 7/0413
455/450

(Continued)

FOREIGN PATENT DOCUMENTS

WO 2014007539 A1 1/2014

OTHER PUBLICATIONS

International Search Report and Written Opinion—PCT/US2015/018953—ISA/EPO—Jul. 28, 2015.

(Continued)

*Primary Examiner* — Nathan Taylor
(74) *Attorney, Agent, or Firm* — Arent Fox LLP

(57) ABSTRACT

Reported CSI may not reflect non-cancelable CRS interference received from an interfering cell, such as when the CSI is computed when CRS interference is not received. To address the issue, a user equipment (UE) may determine an interference cancelation/suppression efficiency (CSE) associated with canceling/suppressing interference from interfering cells. In addition, based on the determined CSE, a UE may compute CSI such that the CSI reflects the true cancelation efficiency of the UE with respect to interfering cell signals. When computing the CSI based on the determined CSE, the UE may report that the CSI is worse than it is to reflect the UE's true cancelation efficiency with respect to the interfering cell signals.

27 Claims, 11 Drawing Sheets

(51) Int. Cl.
*H04B 1/7107* (2011.01)
*H04J 11/00* (2006.01)
*H04L 1/00* (2006.01)
*H04B 7/06* (2006.01)
*H04W 24/10* (2009.01)

(52) U.S. Cl.
CPC .......... *H04B 7/0684* (2013.01); *H04J 11/005* (2013.01); *H04L 1/0026* (2013.01); *H04L 5/0048* (2013.01); *H04B 7/0632* (2013.01); *H04W 24/10* (2013.01)

(56) References Cited

U.S. PATENT DOCUMENTS

| | | | | |
|---|---|---|---|---|
| 2011/0319025 A1* | 12/2011 | Siomina | ................. | H04B 7/024 455/63.1 |
| 2012/0106374 A1* | 5/2012 | Gaal | .................... | H04L 5/0048 370/252 |
| 2014/0003267 A1* | 1/2014 | Yoo | ....................... | H04L 1/0026 370/252 |
| 2014/0044061 A1* | 2/2014 | Yue | .................... | H04W 72/042 370/329 |
| 2014/0086371 A1* | 3/2014 | Li | ....................... | H04J 11/005 375/346 |
| 2015/0103683 A1* | 4/2015 | Kim | ...................... | H04W 24/02 370/252 |
| 2015/0146644 A1* | 5/2015 | Kim | ...................... | H04L 5/0048 370/329 |
| 2015/0270917 A1* | 9/2015 | Roman | ................. | H04J 11/005 370/329 |
| 2015/0282191 A1* | 10/2015 | Luo | ..................... | H04W 72/082 455/452.1 |
| 2015/0296400 A1* | 10/2015 | Yang | ..................... | H04W 16/32 370/252 |

OTHER PUBLICATIONS

3GPP TR 36.866: "3rd Generation Partnership Project, Technical Specification Group Radio Access Network, Study on Network-Assisted Interference Cancellation and Suppression (NAIC) for LTE (Release 12)", Version 12..0.1, 3rd Generation Partnership Project (3GPP), Mobile Competence Centre, 650, Route Des Lucioles, F-06921 Sophia-Antipolis Cedex, France, Mar. 28, 2014, XP050907466, pp. 1-64, Retrieved from the Internet: URL:http://www.3gpp.org/ftp/Specs/2014-12/Rel-12/36_series/ [retrieved on Mar. 28, 2014].

Second Written Opinion from International Application No. PCT/US2015/018953, dated Feb. 29, 2016, 5 pp.

* cited by examiner

CSI REPORT WITH DIFFERENT RECEIVER CAPABILITIES

CROSS-REFERENCE TO RELATED APPLICATION(S)

This application claims the benefit of U.S. Provisional Application Ser. No. 61/973,230, entitled "CSI REPORT WITH DIFFERENT RECEIVER CAPABILITIES" and filed on Mar. 31, 2014, which is expressly incorporated by reference herein in its entirety.

BACKGROUND

1. Field

The present disclosure relates generally to communication systems, and more particularly, to a channel state information (CSI) report with different receiver capabilities.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A UE may report CSI to a serving cell to provide the serving cell with information indicating the expected interference that may impact downlink transmissions. The serving cell may adjust a modulation scheme and coding rate based on the reported CSI. The reported CSI may not reflect non-cancelable interference from cell-specific reference signals. As such, methods/apparatuses are needed for determining how to compute CSI to reflect non-cancelable interference from cell-specific reference signals (CRS).

SUMMARY

Reported CSI may not reflect non-cancelable CRS interference received from an interfering cell, such as when the CSI is computed when CRS interference is not received. To address the issue, a user equipment (UE) may determine an interference cancelation/suppression efficiency (CSE) associated with canceling/suppressing interference from interfering cells. In addition, based on the determined CSE, a UE may compute CSI such that the CSI reflects the true cancelation efficiency of the UE with respect to interfering cell signals. When computing the CSI based on the determined CSE, the UE may report that the CSI is worse than it is to reflect the UE's true cancelation efficiency with respect to the interfering cell signals.

In an aspect of the disclosure, a method, a computer program product, and an apparatus are provided. The apparatus may be a UE. The UE determines a CSE for each cell of a set of cells. In addition, the UE computes CSI based on the determined CSE for each cell of the set of cells. The UE may determine whether CRS from a serving base station is colliding with CRS from each cell of the set of cells. The UE may compute the CSI based on the determination whether CRS from the serving base station is colliding with CRS from each cell of the set of cells. The UE may compute the CSI based on the determination whether CRS from the serving base station is colliding with CRS from each interfering cell of the set of cells. The UE may compute the CSI differently depending on whether there is non-colliding CRS (no CRS colliding from each interfering cell of the set of cells), colliding CRS (colliding CRS from each interfering cell of the set of cells), or partially colliding CRS (colliding CRS from a subset of interfering cells of the set of cells).

DETAILED DESCRIPTION

Figure 1:
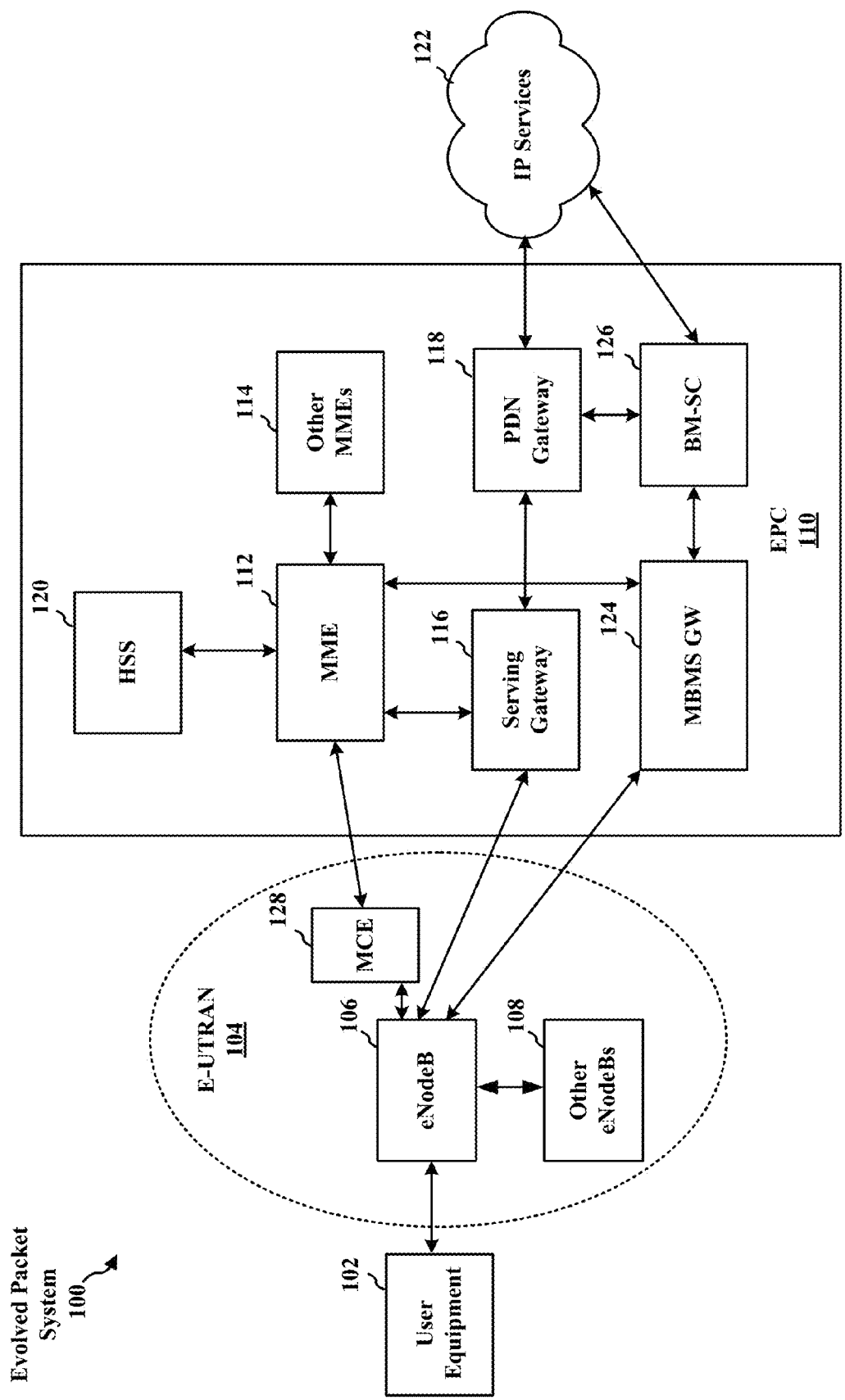
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
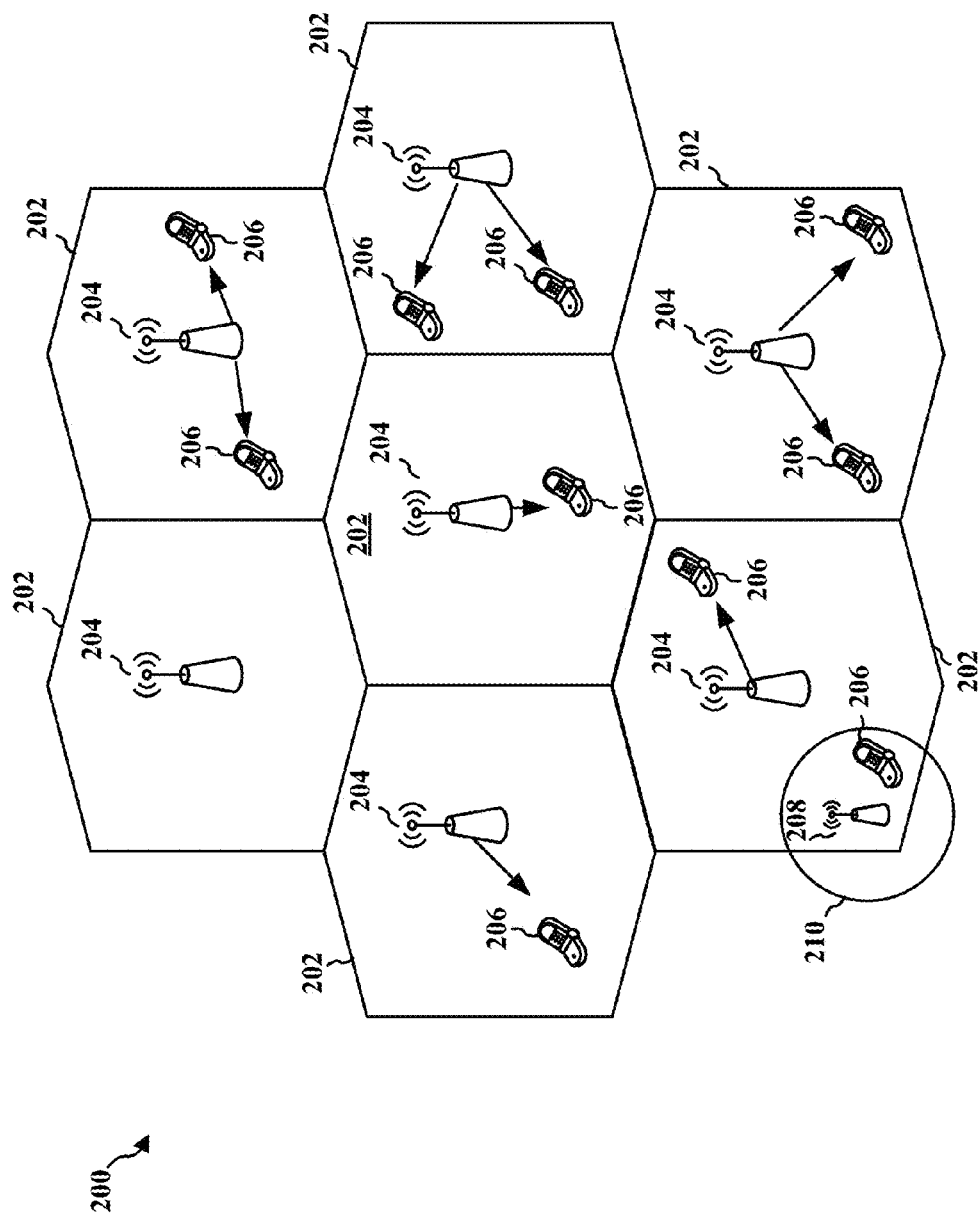
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
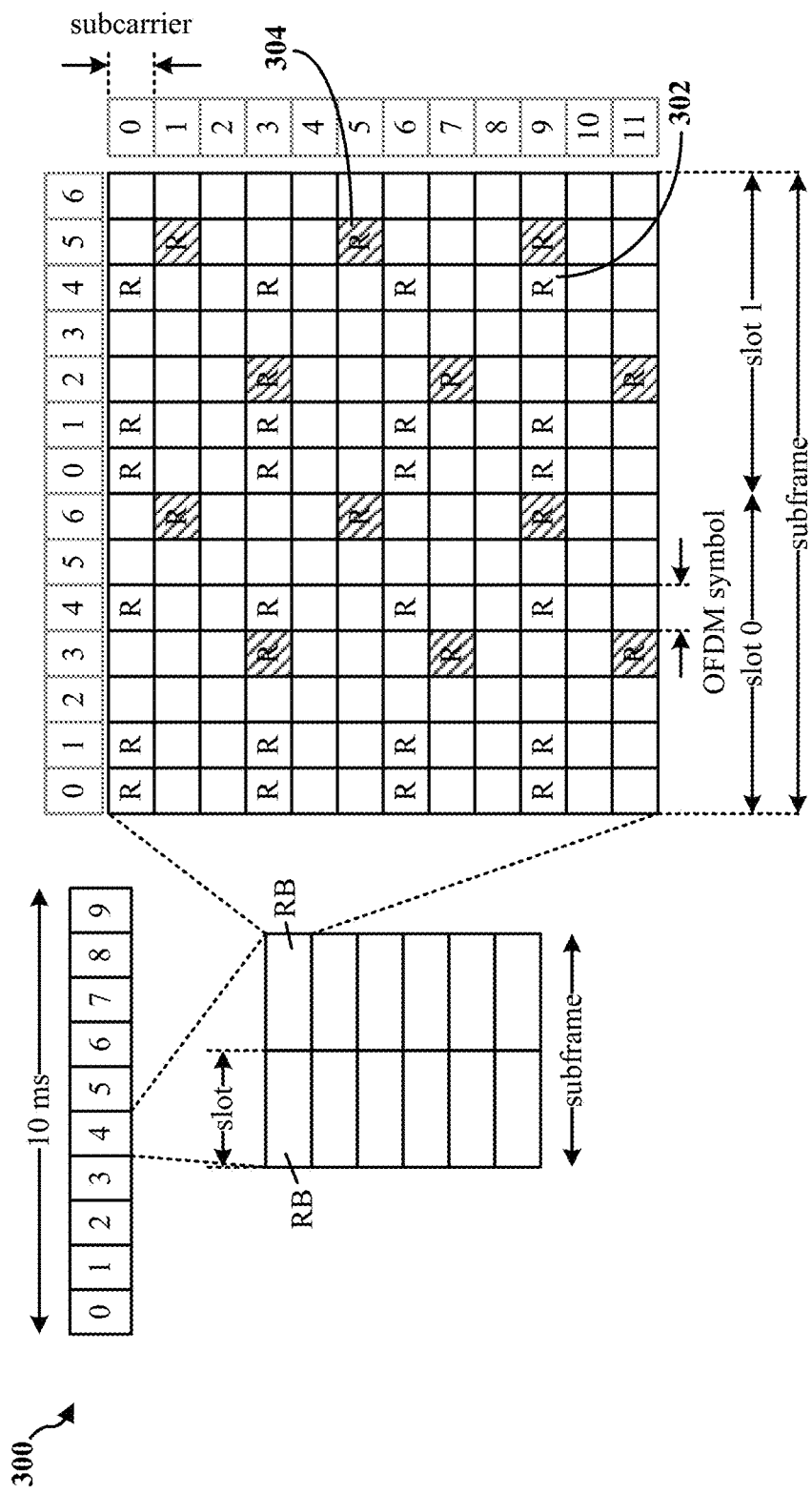
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
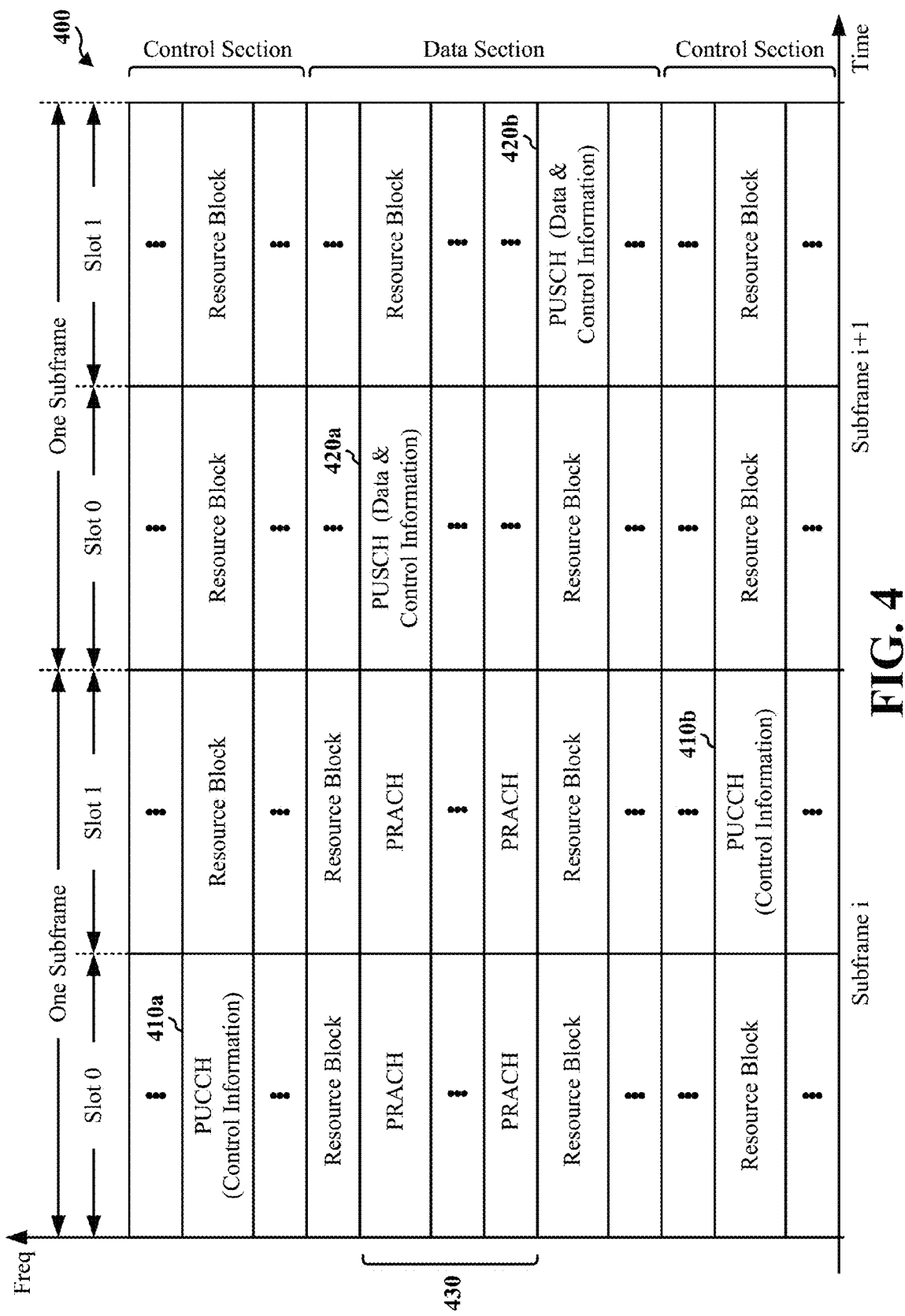
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
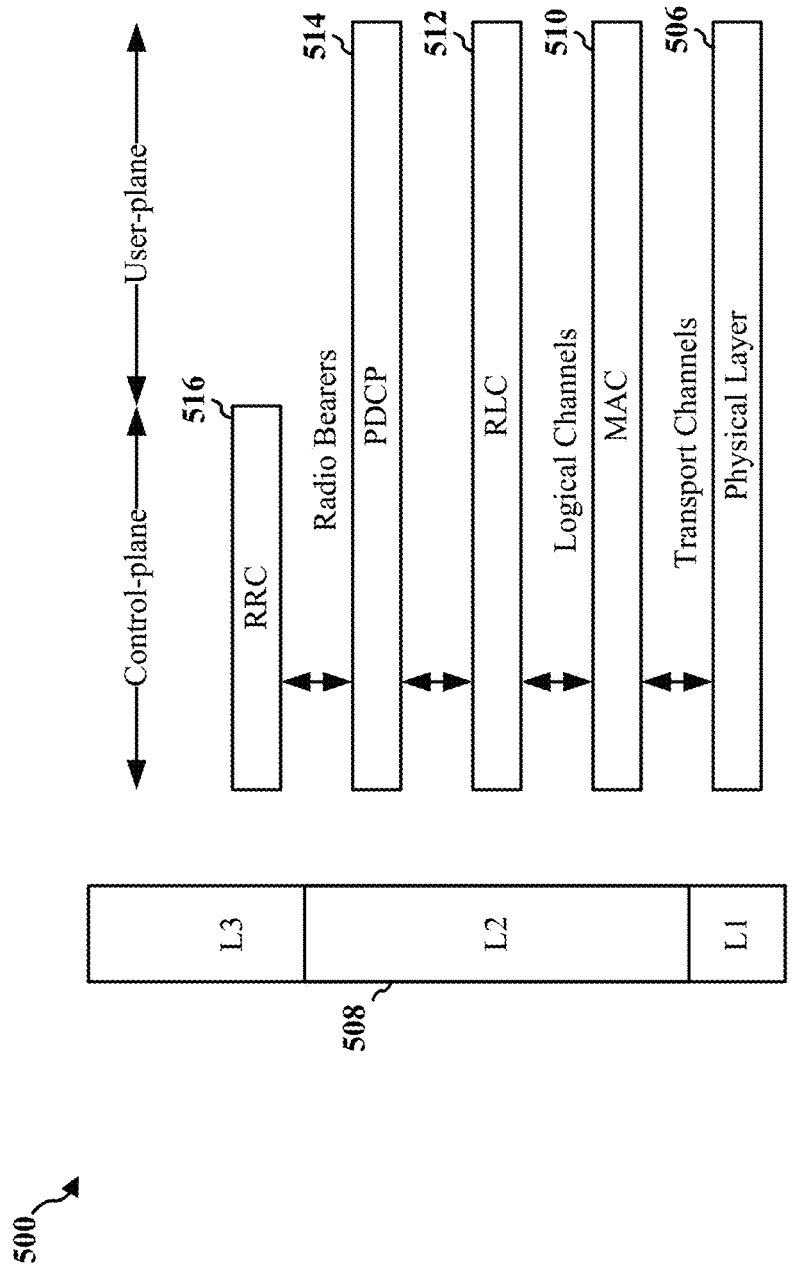
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
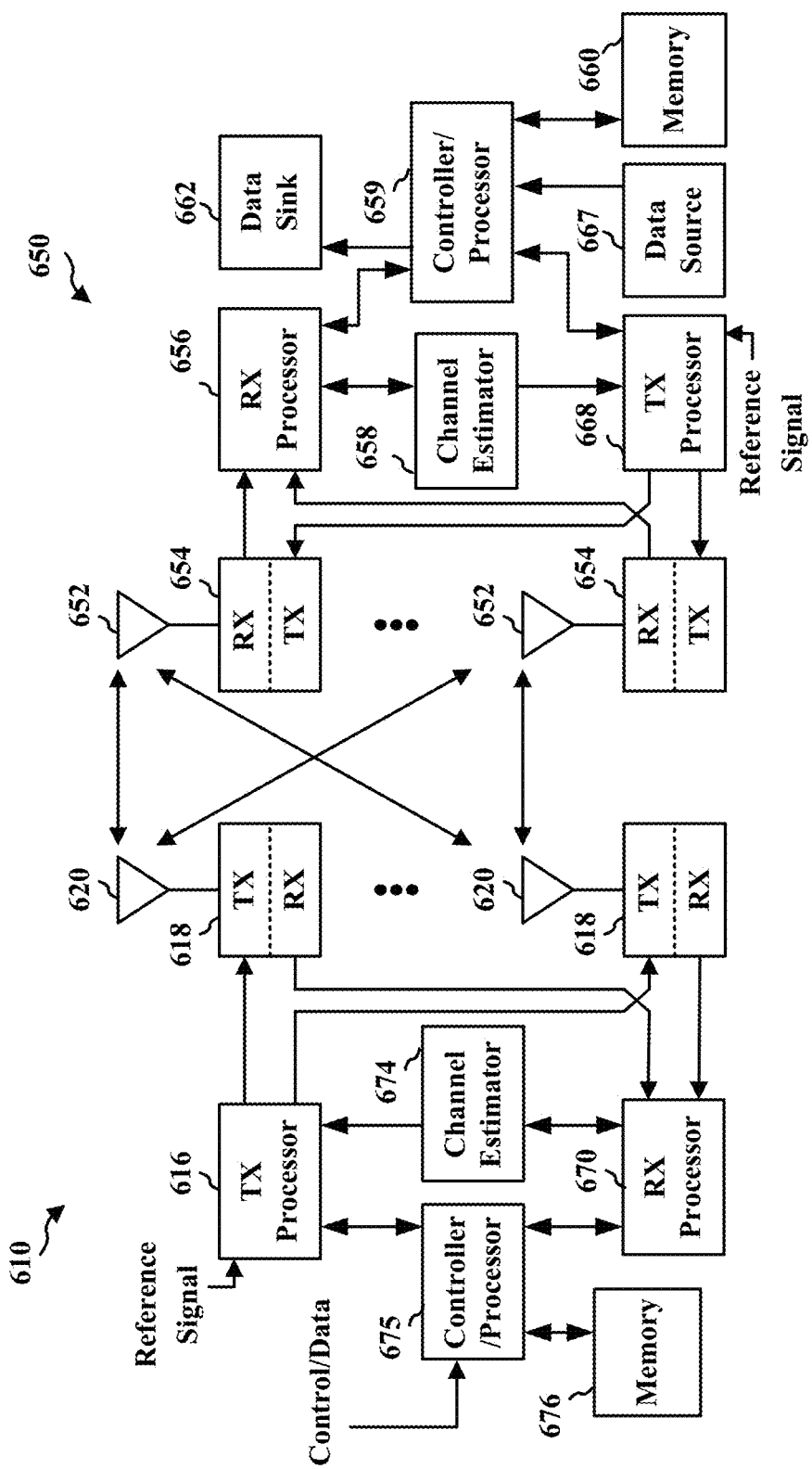
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
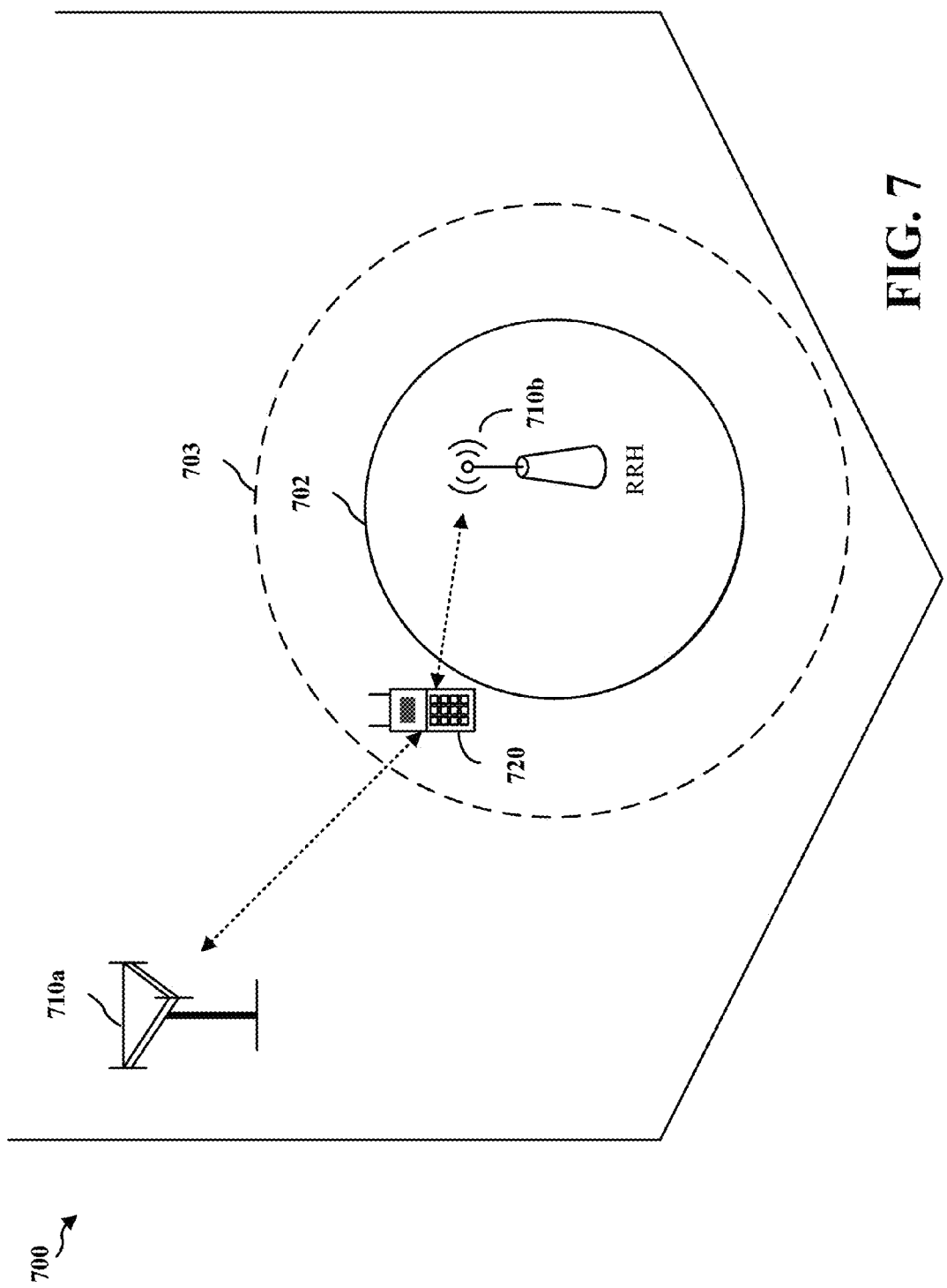
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancelation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

A UE operating in the range of a serving cell may report CSI in a CSI report. CSI reporting may include reporting of channel quality information (CQI), precoding matrix indicators (PMI), and/or a rank indicators (RI) to the serving cell based on the interference the UE experiences over the reference signal transmissions from the serving cell. The reference signals may be cell-specific reference signals (CRS), Channel State Information Reference Signals (CSI-RS), or other similar transmissions. CSI reporting provides the serving cell with information indicating the expected interference that may impact downlink transmissions.

The transmission of CRS by a base station may be on one or more antenna ports of a set of antenna ports. For example, a base station may transmit CRS on one or more antenna ports of antenna ports 0-3. When a serving base station and an interfering base station transmit CRS on the same antenna port, the CRS from the serving base station and the interfering base station overlap (are on the same resource elements), and this may be referred to as colliding CRS. Conversely, when a serving base station and an interfering base station transmit CRS on different antenna ports, the CRS from the serving base station and the interfering base station do not overlap (are not on the same resource elements), and this may be referred to as non-colliding CRS. When CRS from a serving cell does not collide with CRS from an interfering cell, then the CRS from the serving cell collides only with data or nothing at all from the interfering cell.

For CRS-based CSI reporting in relation to non-colliding CRS, the UE may employ data interference cancelation (IC) prior to reporting CSI. For example, a UE may employ data IC on OFDM symbols that carry serving cell CRS and thereby report less interference than actually exists. Specifically, if a UE receives CRS on antenna ports 0 or 1 with a normal cyclic prefix, the UE may employ data IC on the received CRS in OFDM symbols 0, 4, 7, and 11 before reporting CSI; and if a UE receives CRS on antenna ports 2 or 3, the UE may employ data IC on the received CRS in OFDM symbols 1 and 8 before reporting CSI. The CSI reporting may include reporting of CQI, PMI, and/or RI to the serving cell based on such CRS with suppressed/canceled interference.

One issue is that the reported CSI may not reflect non-cancelable CRS interference received from the interfering cell, such as when the CSI is computed when CRS interference is not received. To address the issue, a UE may determine an interference cancelation/suppression efficiency (CSE) associated with canceling/suppressing interference from interfering cells. Such CSE may vary as a function of an interfering cell's transmission properties, such as the modulation order, spatial scheme/transmission rank, precoding, and whether the interfering cell is transmitting. The CSE may vary over physical resource blocks (PRBs) based on the scheduling behavior of interfering cells, as a function of receiver types, and/or as a function of whether CRS from a serving cell and interfering cells are colliding or non-colliding. In addition, based on the determined CSE, a UE may compute CSI such that the CSI reflects the true cancelation efficiency with respect to CRS from interfering cells. When computing the CSI based on the determined CSE, the UE may report that the CSI is worse than it is to reflect the true cancelation efficiency with respect to CRS from interfering cells. Methods/apparatuses are needed for determining how to compute CSI based on the determined CSE.

Figure 8:
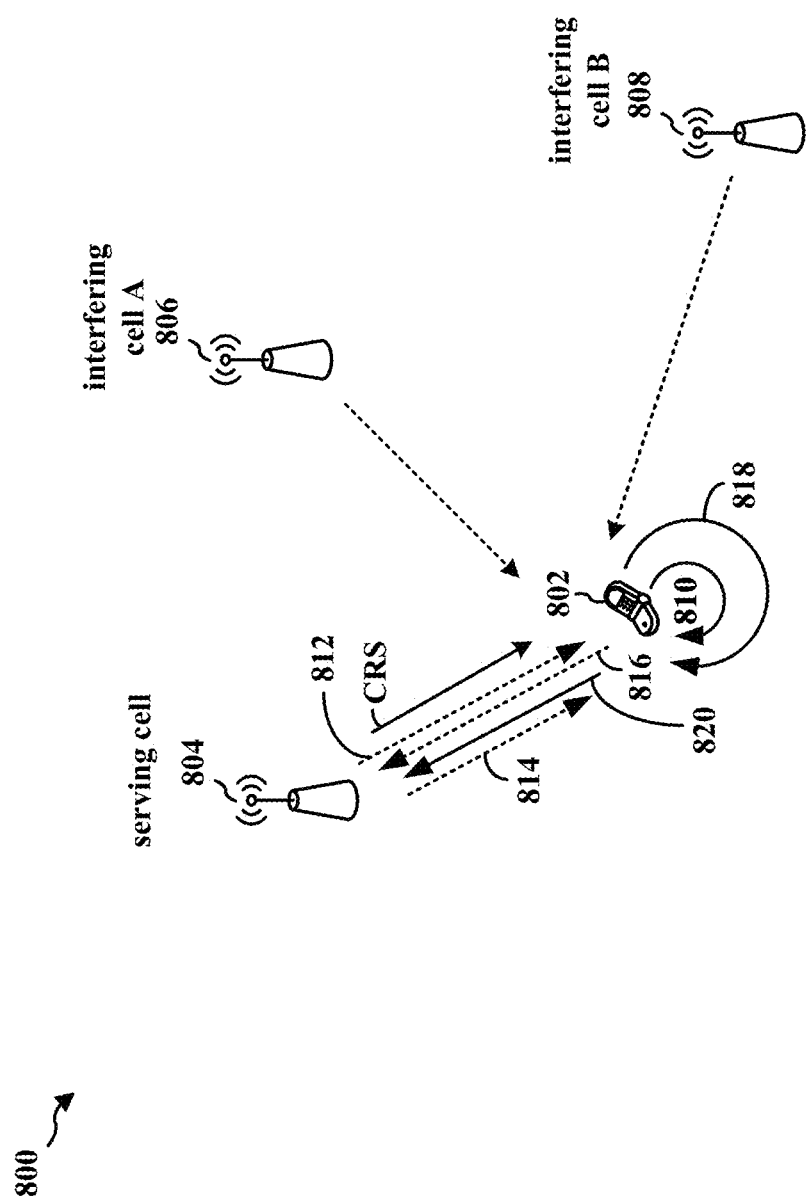
FIG. 8 is a diagram for illustrating an exemplary method for computing CSI feedback using a cancelation/suppression efficiency.

FIG. 8 is a diagram for illustrating an exemplary method 800 for computing CSI feedback using a CSE. As shown in FIG. 8, a UE 802 receives CRS from the serving cell 804. The UE 802 may also receive interfering transmissions from the interfering cell 806 (referred to herein as interfering cell A) and from the interfering cell 808 (referred to herein as interfering cell B). The interfering cells A, B generate interfering transmissions that overlap (i.e., are on the same resource elements as) the CRS from the serving cell 804. Each of the interfering transmissions may be data interference or CRS interference.

When an interfering transmission from an interfering cell is data interference, the UE 802 receives CRS on a set of resource elements from the serving cell 804, and on the same set of resource elements receives the data interference from the interfering cell. Such a scenario is referred to herein as non-colliding CRS, as CRS from the interfering cell and CRS from the serving cell do not collide. Non-colliding CRS also includes when no interfering signal (data or CRS) is received from the interfering cell in the same set of resources elements as the CRS from the serving cell.

When an interfering transmission from an interfering cell is CRS interference, the UE 802 receives CRS on a set of resource elements from the serving cell 804, and on the same set of resource elements receives the CRS interference from the interfering cell. Such a scenario is referred to herein as colliding CRS, as CRS from the interfering cell and CRS from the serving cell collide.

When the UE 802 receives, on the same set of resource elements, CRS from the serving cell 804 and data interference from the interfering cell A, the UE 802 may attempt to cancel the data interference from the interfering cell A, and based on the interference cancelation attempt, determine 810 a CSE for canceling the interference from the interfering cell A. Likewise, when the UE 802 receives, on the same set of resource elements, CRS from the serving cell 804 and data interference from the interfering cell B, the UE 802 may attempt to cancel the data interference from the interfering cell B, and based on the interference cancelation attempt, determine 810 a CSE for canceling the interference from the interfering cell B.

The UE 802 may maintain a CSI cell list for CSE for each of the interfering cells A, B. The CSI cell list for CSE may list each of the interfering cells A and B, and the determined CSE for each of the interference cells A and B. In general, if there are N interfering cells, the UE 802 may maintain a CSI cell list for CSE for any subset of the N interfering cells. For example, if there are N interfering cells, the UE 802 may maintain a CSI cell list for CSE for all N of the interfering cells. For each cell in the CSI cell list, the UE 802 may compute 810 one or more CSEs, each of which indicates an efficiency with respect to canceling CRS interference from a respective interfering cell. The UE 802 may maintain one or more CSEs for each interfering cell. In one configuration, the UE 802 may maintain one CSE for each interfering cell. In another configuration, for at least one of the interfering cells, the UE 802 may maintain multiple CSEs. Specifically, for a particular interfering cell, the UE 802 may maintain multiple CSEs that are specific to one or more of the transmission properties (e.g., modulation order, spatial scheme, transmission rank, etc.) of the interfering transmissions from the particular interfering cell. The UE 802 may average the computed CSE(s) for each cell individually over a period of time or at a particular frequency/periodicity. If maintaining multiple CSEs for a particular interfering cell, the UE 802 may average the CSEs separately. For example, the UE 802 may maintain a first CSE for QPSK from the interfering cell A, and a second CSE for 16-QAM from the interfering cell A, and average the first and second CSEs separately with subsequently computed CSEs for QPSK and 16-QAM, respectively. The serving eNB 804 may signal the time/frequency averaging policy 812 to the UE 802. If the UE 802 determines that the CSE equals 0, then the UE cannot perform interference cancelation/suppression with any success. If the UE determines that the CSE equals 1, then the UE is able to perform perfect interference cancelation/suppression. Accordingly, the UE 802 maintains a list of computed CSE values for each interfering cell, where the CSE indicates how effectively the UE can perform interference cancelation/suppression with respect to that interfering cell.

The UE 802 may determine the CSE based on a reference resource. For each interfering cell in the CSI cell list, the UE 802 may receive information 814 indicating the reference resource for determining the CSE. The reference resource may have zero power (i.e., interfering cell is not transmitting) or non-zero power (i.e., interfering cell is transmitting). If the reference resource has zero power for a particular subframe, then the UE 802 cannot calculate the CSE based on the reference resource in that subframe. If the reference resource has non-zero power, the reference resource may contain a signal with unknown properties, partially known properties, or fully known properties to the UE 802. If only a QPSK CSE is needed, the UE 802 may use an existing transmission to determine the CSE. In this case, the UE 802 need not be signaled the reference resource. For example, to determine the CSE, the UE 802 may use an interfering SIB 1 transmission or an interfering physical downlink control channel (PDCCH) transmission for which the UE 802 is provided or can blind decode the spatial scheme/transmission rank and modulation order.

In one configuration, the UE 802 may provide 816 the computed CSE for each cell to the serving eNB 804. In another configuration, the UE 802 may compute 818 the CSI using the CSE, and report 820 the computed CSI to the serving eNB 804. The UE 802 may compute the CSI differently based on whether the CRS from the serving cell 804 collides with CRS from one or more of the interfering cells A, B.

When the CRS from the serving cell 804 does not collide with the CRS from the interfering cells A, B (e.g., the CRS from the serving cell 804 collides with data from one or more of the interfering cells A and B, or one or more of the interfering cells A and B are not transmitting; referred to as a "non-colliding CRS scenario"), the UE 802 may compute the CSI without performing interference cancelation/suppression for the CSI computation. Accordingly, with non-colliding CRS for all interfering cells, the UE 802 uses no cancelation assumption to compute the CSI. The UE 802 subsequently reports the computed CSI.

When the CRS from the serving cell 804 collides with the CRS from all interfering cells (referred to as "colliding CRS scenario"), the UE 802 may apply weights to the CSE for each interfering cell, and compute the CSI based on the weighted CSE. In one specific example, the weights by be 0 or 1. In such example, the UE 802 may apply weights 0 or 1 to the CSE for each interfering cell, and compute the CSI based on the weighted CSE. For example, when the CRS from the serving cell 804 collides with the CRS from each of the interfering cells A, B, the UE 802 may apply weights 0 or 1 to the determined CSE and compute the CSI based on the weighted CSE. Assume the CSE for each of the interfering cells A, B is non-zero. If weights 0, 0 are applied to the CSE of the interfering cells A, B, respectively, the UE 802 does not cancel/suppress interference from the interfering cells A, B when computing CSI and reports the computed CSI. If weights 0, 1 are applied to the CSE of the interfering cells A, B, respectively, the UE 802 cancels/suppresses the interference from the interfering cell B, but not the interfering cell A, when computing the CSI and reports the computed CSI. If weights 1, 0 are applied to the CSE of the interfering cells A, B, respectively, the UE 802 cancels/suppresses the interference from the interfering cell A, but not the interfering cell B, when computing the CSI and reports the computed CSI. If weights 1, 1 are applied to the CSE of the interfering cells A, B, respectively, the UE 802 cancels/suppresses the interference from both of the interfering cells A and B when computing the CSI and reports the computed CSI. Irrespective of the weights, if the CSE is zero for an interfering cell, the UE 802 does not cancel/suppress the interference for such interfering cell when computing the CSI.

In general, for the colliding CRS scenario, a UE may receive signal $y=h+n+I_A+I_B$, where h is the CRS from the serving cell, n is noise, $I_A$ is the CRS interference from the interfering cell A, and $I_B$ is the CRS interference from the interfering cell A. The UE may cancel the interference $I_A$ with cancelation efficiency $CSE_A$, and cancel the interference $I_B$ with cancelation efficiency $CSE_B$. When applying weights $w_A$ and $w_B$ for the cancelation of the interference, the UE may cancel less interference than the cancelation efficiency when $0<w_A<1$ and/or $0<w_B<1$ (when $w_A=0$ and $w_B=0$, there is no cancelation of interference). For example, the UE may cancel the interference such that an updated signal $y'=h+n+(1-w_A CSE_A)I_A+(1-w_B CSE_B)I_B$. Due to the weights, more or less interference from the interfering cells A, B may be canceled. The UE may then compute the CSI based on the updated signal y', and report the computed CSI to a serving cell.

When the CRS from the serving cell 804 collides with the CRS from a subset of the interfering cells and does not collide with the CRS from a remaining subset of the interfering cells (i.e., a mixed deployment scenario; referred to as "partially colliding CRS scenario"), the UE 802 may compute the CSI based on a clean colliding computation assumption or an unclean colliding computation assumption. In the clean colliding computation assumption, when computing the CSI, the UE 802 cancels/suppresses interference from the colliding interfering cells, and adds a (1−CSE) 100% noise contribution from the uncolliding cells. In the unclean colliding computation assumption, when computing the CSI, the UE 802 does not cancel/suppress interference from the colliding interfering cells, and adds a 100% noise contribution from the uncolliding cells.

For example, assume that the CRS from the serving cell 804 collides with the CRS from the interfering cell A, but not with CRS from the interfering cell B. Assume also that CRS interference from cell A is $I_A$ and that CRS interference from cell B is $I_B$. In this case, then, the UE 802 receives the signal y=h+n+$I_A$, where h is the CRS from the serving cell, n is noise, and $I_A$ is the CRS interference from the interfering cell A. Further, assume also the CSE associated with interfering cell A is $CSE_A$ and that the CSE associated with interfering cell B is $CSE_B$. If the UE 802 computes the CSI based on a clean colliding computation assumption and the $CSE_A$ of the interfering cell A is non-zero, the UE 802 cancels/suppresses the interference from the interfering cell A ($CSE_A I_A$ interference is canceled, leaving a noise contribution of (1−$CSE_A$) $I_A$), and adds in a noise contribution from the interfering cell B ((1−$CSE_B$)$I_B$), which provides an updated signal y'=h+n+(1−$CSE_A$)$I_A$+(1−$CSE_B$)$I_B$. Based on the updated signal y'=h+n+(1−$CSE_A$)$I_A$+(1−$CSE_B$)$I_B$, the UE 802 computes CSI, and reports the computed CSI. If the UE 802 computes the CSI based on an unclean colliding computation assumption, the UE 802 does not cancel/suppress the interference from the interfering cell A, and adds in a noise contribution from the interfering cell B, which provides an updated signal y'=h+n+$I_A$+$I_B$. Based on the updated signal y'=h+n+$I_A$+$I_B$, the UE 802 computes CSI, and reports the computed CSI. The UE 802 may report multiple CSI under different noise hypothesis in one subframe or over different subframes. The UE 802 may report the CSI in a measurement report if long-term averaging of CSE is performed.

Weights may apply in the mixed deployment situation as well. Generally, in the above example in which CRS from the serving cell 804 collides with CRS from the interfering cell A, but not with CRS from the interfering cell B, a UE may apply weight $w_B$ to an updated signal y'=h+n+(1−$CSE_A$)$I_A$+$w_B$(1−$CSE_B$)$I_B$ for a clean colliding computation assumption, and to an updated signal y'=h+n+$I_A$+$w_B$$I_B$ for an unclean colliding computation assumption. In both cases, the weight $w_B$ limits the amount of interference added in before computing CSI. In the above example, if the weights are x,0 for the interfering cells A, B (here, x weight, which can be either a 0 or a 1, has no affect due to the clean colliding assumption), respectively, in a clean colliding assumption, then the CRS interference is canceled from the interfering cell A (leaving a noise contribution of (1−$CSE_A$)$I_A$) and no CRS interference for the interfering cell B is added into the received signal before computing the CSI (i.e., CSI is computed based on y'=h+n+(1−$CSE_A$)$I_A$). If the weights are x,1 for the interfering cells A, B, respectively, in a clean colliding assumption, then the CRS interference is canceled from the interfering cell A (leaving a noise contribution of (1−$CSE_A$)$I_A$) and CRS interference for interfering cell B ((1−$CSE_B$)$I_B$) is added into the received signal before computing the CSI (i.e., CSI is computed based on y'=h+n+(1−$CSE_A$)$I_A$+(1−$CSE_B$)$I_B$). As discussed supra, a weight of 0 for the interfering cell B indicates that interference for the interfering cell B is not added in before computing the CSI, and a weight of 1 for the interfering cell B indicates that interference for the interfering cell B is added in before computing the CSI. However, the weights may be reversed such that a weight of 0 for the interfering cell B indicates that interference for the interfering cell B is added in before computing the CSI, and a weight of 1 for the interfering cell B indicates that interference for the interfering cell B is not added in before computing the CSI.

For another example, if the weights are x,0 for the interfering cells A, B (here, x weight, which can be either a 0 or a 1, has no affect due to the unclean colliding assumption), respectively, in an unclean colliding assumption, then the CRS interference is not canceled from the interfering cell A and no CRS interference for the interfering cell B is added into the received signal before computing the CSI (i.e., CSI is computed based on y'=h+n+$I_A$). If the weights are x,1 for the interfering cells A, B, respectively, in an unclean colliding assumption, then the CRS interference is not canceled from the interfering cell A and CRS interference for the interfering cell B ($I_B$) is added into the received signal before computing the CSI (i.e., CSI is computed based on y'=h+n+$I_A$+$I_B$). As discussed supra, a weight of 0 for the interfering cell B indicates that interference for the interfering cell B is not added in before computing the CSI, and a weight of 1 for the interfering cell B indicates that interference for the interfering cell B is added in before computing the CSI. However, the weights may be reversed such that a weight of 0 for the interfering cell B indicates that interference for the interfering cell B is added in before computing the CSI, and a weight of 1 for the interfering cell B indicates that interference for the interfering cell B is not added in before computing the CSI.

The serving eNB 804 may signal in a bit-mask how the UE 802 should handle the computation of the CSI based on the CSE. The serving eNB 804 may also signal the weights for the colliding CRS scenario and/or the mixed deployment scenario. In another configuration, the UE 802 may determine weights based on the subframe partitioning pattern, where the UE 802 reports all cancelable colliders on unprotected subframes and none of the cancelable colliders on protected subframes. Cancellable colliders may, for example, include all interfering cells or any interfering cell having a CSE greater than a minimum threshold. Alternatively or additionally, interfering cells may be identified by signaling from the serving eNB, blind detection by the UE, as part of the searcher process, as part of an interference cancellation/suppression process, or through various other techniques.

With respect to reporting the CSI, the UE may report periodically or aperiodically. For aperiodic reporting, a UE may report the CSI on the PUSCH when the UE receives an uplink resource grant on the PDCCH with a set CSI request bit from the serving cell. For periodic reporting, the frequency/periodicity at which CSE is determined and the CSI is reported may be controlled by the serving cell. The UE may send the computed CSI in a measurement report to the serving cell, such as when the UE maintains a long-term average of the CSE.

Figure 9:
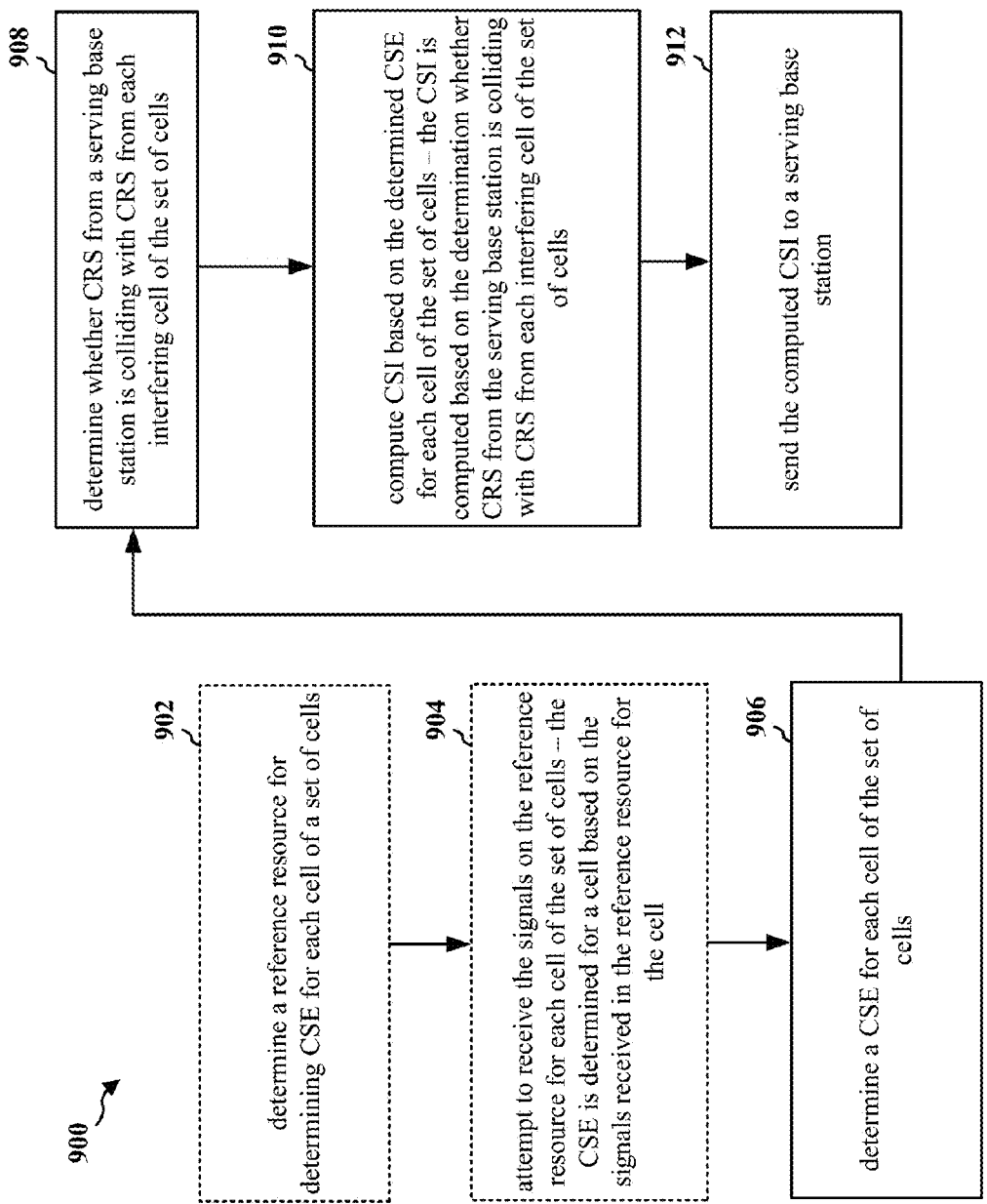
FIG. 9 is a flowchart of a method of wireless communication.

FIG. 9 is a flowchart 900 of a method of wireless communication. The method may be performed by a UE, such as the UE 802. Steps having dashed lines, such as 902 and 904 represent optional steps of the method in flowchart 900.

At 902, the UE may determine a reference resource for determining CSE for each cell of the set of cells. The set of cells includes one or more interfering cells. The set of cells may further include a serving cell. The UE may determine the reference resource for determining the CSE for each cell of the set of cells based on at least one of a modulation order or coding scheme. For example, if only a QPSK efficiency is needed for interference cancelation/suppression of interfering signals from an interfering cell, the UE may determine the reference resource to be the resource on which an interfering transmission using QPSK (e.g., SIB 1 or PDCCH transmission) is received from the interfering cell.

At 904, the UE may attempt to receive the signals on the reference resource for each cell of the set of cells. In one configuration, steps 902, 904 are performed. In another configuration, steps 902, 904 are not performed, such as when the UE does not use a reference resource for determining the CSE.

At 906, the UE determines a CSE for each cell of a set of cells. When steps 902, 904 are performed, the UE determines the CSE for a cell based on the signals received in the reference resource for the cell. In one configuration, the UE may send the computed CSE in a payload to a serving base station.

At 908, the UE may determine whether CRS from a serving base station is colliding with CRS from each interfering cell of the set of cells. The UE may make such a determination by determining whether received interference is data interference or CRS interference.

At 910, the UE computes CSI based on the determined CSE for each interfering cell of the set of cells. The UE may compute the CSI based on the determination whether CRS from the serving base station is colliding with CRS from each interfering cell of the set of cells. For example, if the UE determines that no CRS is colliding with CRS from the serving cell, the UE may determine the CSI based on the aforementioned non-colliding CRS scenario in which the UE may compute the CSI without performing interference cancelation/suppression for the CSI computation. For another example, if the UE determines that CRS from all interfering cells is colliding with CRS from the serving cell, the UE may determine the CSI based on the aforementioned colliding CRS scenario in which the UE may apply weights $w_A$ or $w_B$, as discussed supra, to the CSE for each interfering cell and compute the CSI based on the weighted CSE. For yet another example, if the UE determines that CRS from a subset of the interfering cells is colliding with CRS from the serving cell, the UE may determine the CSI based on the aforementioned mixed-deployment scenario. Weights may also apply in the mixed-deployment scenario, as discussed supra.

The steps 906 and 910 may be triggered by a measurement event. For example, a UE may receive a request for an aperiodic CSI reporting through reception of a CSI request bit in a received uplink resource grant on the PDCCH. Subsequently, in step 912, the UE sends the computed CSI through the PUSCH to a serving base station. The UE may send the computed CSI in a measurement report to the serving base station, such as when the UE maintains a long-term average of the CSE.

In one configuration, in step 908, the UE determines that the CRS from the serving base station is non-colliding with CRS from each interfering cell of the set of cells (i.e., non-colliding CRS scenario). In such a configuration, in step 910, the UE computes the CSI without performing interference cancelation/suppression of signals received from the set of cells.

In one configuration, in step 908, the UE determines that the CRS from the serving base station is colliding with CRS from each interfering cell of the set of cells (i.e., colliding CRS scenario). In such a configuration, in step 910, the UE applies a weight to the computed CSE for each interfering cell of the set of cells and computes the CSI based on the weighted CSE for each interfering cell of the set of cells. The UE may compute the CSI without performing interference cancelation/suppression of signals received from an interfering cell when the weighted CSE is zero and with performing interference cancelation/suppression of signals received from an interfering cell when the weighted CSE is non-zero.

In one configuration, in step 908, the UE determines that the CRS from the serving base station is colliding with CRS from a first subset of interfering cells of the set of cells and is non-colliding with CRS from a second subset of interfering cells of the set of cells (i.e., mixed-deployment scenario). In such a configuration, in step 910, the UE determines whether to cancel/suppress interference from interfering cells with colliding CRS. Further, in such a configuration, the UE computes the CSI without performing interference cancelation/suppression of signals received from an interfering cell with colliding CRS upon determining to refrain from canceling/suppressing interfering signals from the interfering cell. Further, in such a configuration, the UE computes the CSI with performing interference cancelation/suppression of signals received from an interfering cell with colliding CRS upon determining to cancel/suppress interfering signals from the interfering cell. The UE may compute the CSI by averaging a plurality of calculated CSE values.

Figure 10:
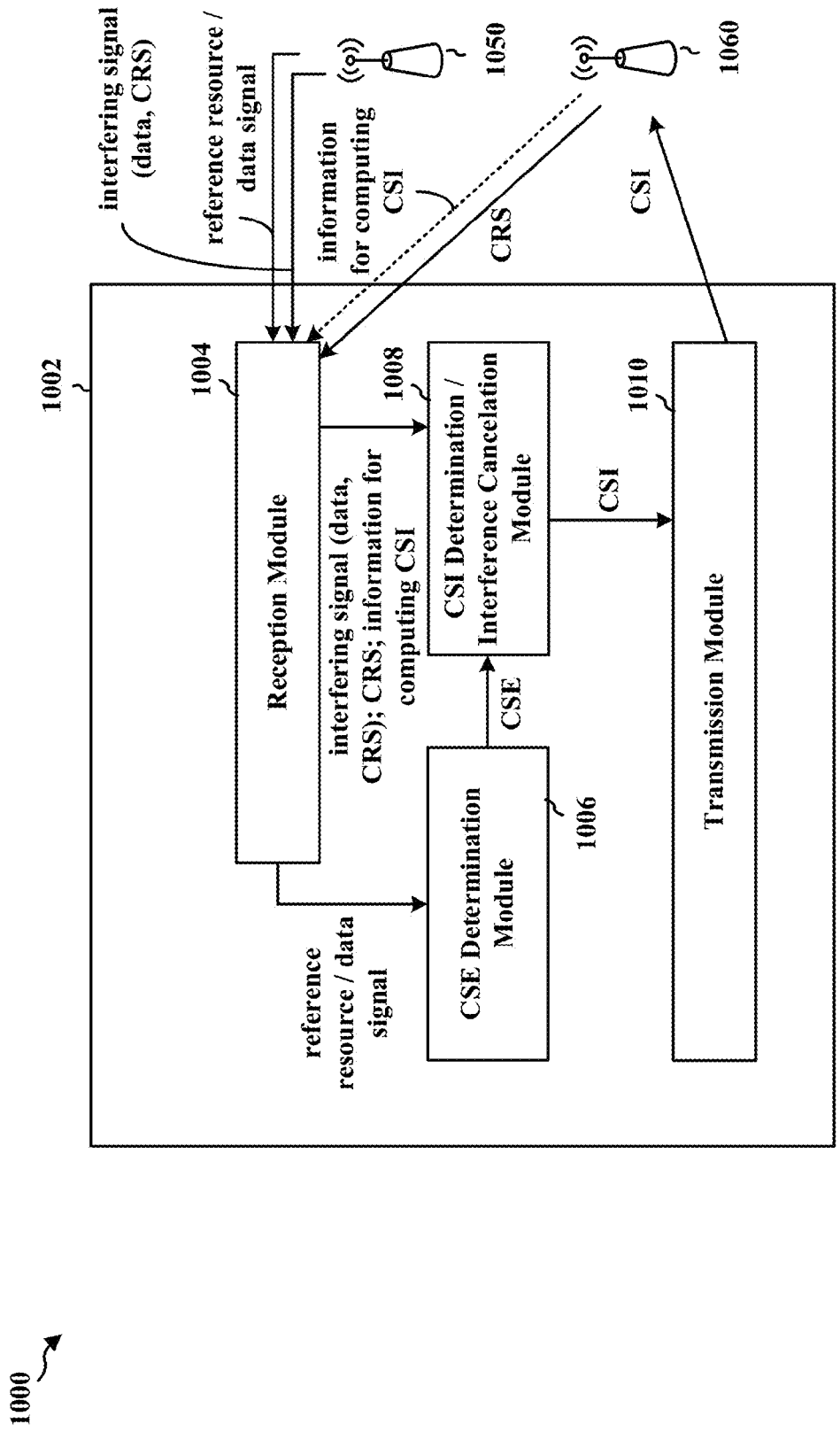
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE, such as the UE 802. The apparatus 1002 includes a reception module 1004, a CSE determination module 1006, a CSI determination/interference cancelation module 1008, and a transmission module 1010. The reception module 1004 is configured to receive information for computing CSI from a serving cell 1060. The information for computing the CSI may include a bit-mask, weights, or other information needed for informing the UE how to compute the CSI. The reception module 1004 is also configured to receive a data signal, which may be a reference resource, from one or more interfering cells 1050 for determining a CSE. The reception module 1004 is also configured to receive CRS from a serving cell 1060 and an interfering signal (data, CRS) from the one or more interfering cells 1050. The CSE determination module 1006 is configured to determine a cancelation/suppression efficiency (CSE) for each cell of a set of cells based on a data signal, which may be a reference resource. The CSE determination module 1006 is configured to provide determined CSEs to the CSI determination/interference cancelation module 1008. The CSI determination/interference cancelation module 1008 is configured to compute CSI based on the determined CSE for each cell of the set of cells. The CSI determination/interference cancelation module 1008 may be configured to provide the computed CSI to the transmission module 1010, which may be configured to transmit the computed CSI to the serving cell 1060.

In one configuration, the set of cells include at least one of an interfering cell 1050, a serving cell 1060, or a combination thereof. In one configuration, the reception module 1004 is configured to determine a reference resource for determining the CSE for each cell of the set of cells. In addition, the reception module 1004 is configured to attempt to receive the signals on the reference resource for each cell of the set of cells. In such a configuration, the CSE determination module 1006 may be configured to determine the CSE for a cell based on the signals received in the reference resource for the cell. In one configuration, the reception module 1004 may be configured to determine a reference resource for determining the CSE for each cell of the set of cells based on at least one of a modulation order or coding scheme. In one configuration, the transmission module 1010 may be configured to send the computed CSE in a payload to a serving base station. In one configuration, the CSE determination module and the CSI determination/interference cancelation module are configured to determine the CSE and to compute the CSI based on the CSE, respectively, based on triggering by a measurement event. In one configuration, the CSI determination/interference cancelation module 1008 may be configured to determine whether CRS from the serving base station 1060 is colliding with CRS from each interfering cell of the set of cells 1050, and to compute the CSI based on the determination whether CRS from the serving base station is colliding with CRS from each interfering cell of the set of cells. In one configuration, the CRS from the serving base station is non-colliding with CRS from each interfering cell of the set of cells, and the CSI is computed without performing interference cancelation/suppression of signals received from the set of cells. In one configuration, the CRS from the serving base station is colliding with CRS from each interfering cell of the set of cells, and the CSI determination/interference cancelation module 1008 is configured to apply a weight to the computed CSE for each interfering cell of the set of cells. The CSI may be computed based on the weighted CSE for each interfering cell of the set of cells. In one configuration, the CSI is computed without performing interference cancelation/suppression of signals received from an interfering cell when the weighted CSE is zero and with performing interference cancelation/suppression of signals received from an interfering cell when the weighted CSE is non-zero. In one configuration, the CRS from the serving base station is colliding with CRS from a first subset of interfering cells of the set of cells and is non-colliding with CRS from a second subset of interfering cells of the set of cells, and the CSI determination/interference cancelation module 1008 is configured to determine whether to cancel/suppress interference from interfering cells with colliding CRS. In one configuration, the CSI is computed without performing interference cancelation/suppression of signals received from an interfering cell with colliding CRS upon determining to refrain from canceling/suppressing interfering signals from the interfering cell. In one configuration, the CSI is computed with performing interference cancelation/suppression of signals received from an interfering cell with colliding CRS upon determining to cancel/suppress interfering signals from the interfering cell. In one configuration, the CSI is computed by averaging a plurality of calculated CSE values.

The apparatus may include additional modules that perform each of the blocks of the algorithm in the aforementioned flowchart of FIG. 9. As such, each block in the aforementioned flowchart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
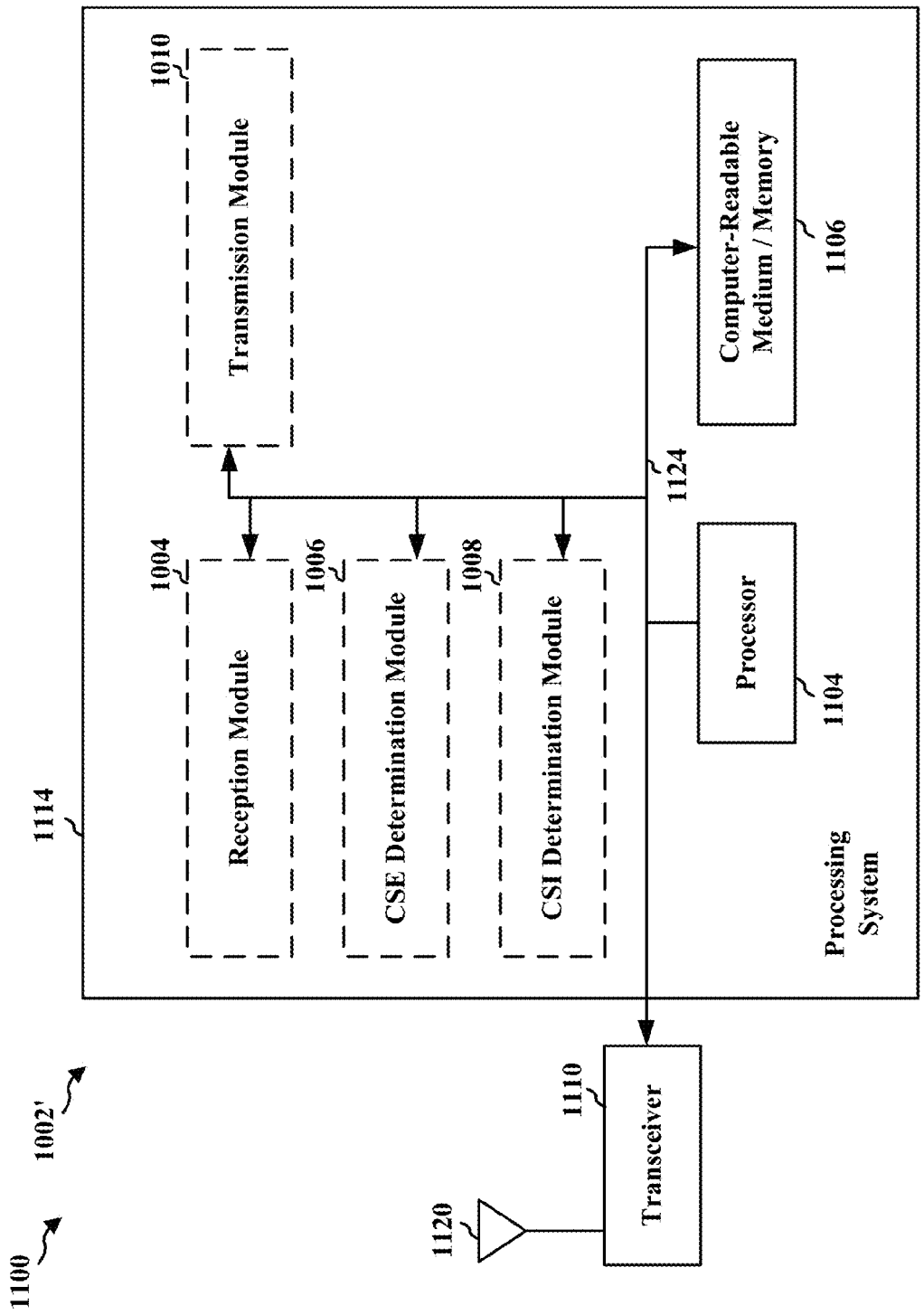
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception module 1004. In addition, the transceiver 1110 receives information from the processing system 1114, specifically the transmission module 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010. The modules may be software modules running in the processor 1104, resident/stored in the computer readable medium/memory 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for determining a cancelation/suppression efficiency (CSE) for each cell of a set of cells, and means for computing CSI based on the determined CSE for each cell of the set of cells. The apparatus may further includes means for determining a reference resource for determining the CSE for each cell of the set of cells, and means for attempting to receive the signals on the reference resource for each cell of the set of cells. The CSE may be determined for a cell based on the signals received in the reference resource for the cell. The apparatus may further include means for determining a reference resource for determining the CSE for each cell of the set of cells based on at least one of a modulation order or coding scheme. The apparatus may further include means for sending the computed CSE in a payload to a serving base station. The apparatus may further include means for determining whether CRS from a serving base station is colliding with CRS from each interfering cell of the set of cells. The CSI may be computed based on the determination whether CRS from the serving base station is colliding with CRS from each interfering cell of the set of cells. In one configuration, the CRS from the serving base station is non-colliding with CRS from each interfering cell of the set of cells, and the CSI is computed without performing interference cancelation/suppression of signals received from the set of cells. In one configuration, the CRS from the serving base station is colliding with CRS from each interfering cell of the set of cells, and the apparatus further includes means for applying a weight to the computed CSE for each interfering cell of the set of cells, wherein the CSI is computed based on the weighted CSE for each interfering cell of the set of cells. In one configuration, the CRS from the serving base station is colliding with CRS from a first subset of interfering cells of the set of cells and is non-colliding with CRS from a second subset of interfering cells of the set of cells, and the apparatus further includes means for determining whether to cancel/suppress interference from interfering cells with colliding CRS.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining a cancelation/suppression efficiency (CSE) for each cell of a set of cells;
   determining whether cell-specific reference signals (CRS) from a serving base station is colliding with CRS from each interfering cell of the set of cells; and
   computing channel state information (CSI) based on the determined CSE for each cell of the set of cells, wherein the CSI is computed based on the determination of whether CRS from the serving base station is colliding with CRS from each interfering cell of the set of cells.

2. The method of claim 1, wherein the set of cells include at least one of an interfering cell, a serving cell, or a combination thereof.

3. The method of claim 1, further comprising:
   determining a reference resource for determining the CSE for each cell of the set of cells; and
   attempting to receive the signals on the reference resource for each cell of the set of cells, wherein the CSE is determined for a cell based on the signals received in the reference resource for the cell.

4. The method of claim 1, further comprising determining a reference resource for determining the CSE for each cell of the set of cells based on at least one of a modulation order or coding scheme.

5. The method of claim 1, further comprising sending the computed CSE in a payload to a serving base station.

6. The method of claim 1, wherein the determining and the computing are triggered by a measurement event.

7. The method of claim 1, wherein the CRS from the serving base station is non-colliding with CRS from each interfering cell of the set of cells, and the CSI is computed without performing interference cancelation/suppression of signals received from the set of cells.

8. The method of claim 1, wherein the CRS from the serving base station is colliding with CRS from each interfering cell of the set of cells, and the method further comprises applying a weight to the computed CSE for each interfering cell of the set of cells, wherein the CSI is computed based on the weighted CSE for each interfering cell of the set of cells.

9. The method of claim 8, wherein the CSI is computed without performing interference cancelation/suppression of signals received from an interfering cell when the weighted CSE is zero and with performing interference cancelation/suppression of signals received from an interfering cell when the weighted CSE is non-zero.

10. The method of claim 1, wherein the CRS from the serving base station is colliding with CRS from a first subset of interfering cells of the set of cells and is non-colliding with CRS from a second subset of interfering cells of the set of cells, and the method further comprises determining whether to cancel/suppress interference from interfering cells with colliding CRS.

11. The method of claim 10, wherein the CSI is computed without performing interference cancelation/suppression of signals received from an interfering cell with colliding CRS upon determining to refrain from canceling/suppressing interfering signals from the interfering cell.

12. The method of claim 10, wherein the CSI is computed with performing interference cancelation/suppression of signals received from an interfering cell with colliding CRS upon determining to cancel/suppress interfering signals from the interfering cell.

13. The method of claim 10, wherein the CSI is computed by averaging a plurality of calculated CSE values.

14. An apparatus for wireless communication, comprising:
    means for determining a cancelation/suppression efficiency (CSE) for each cell of a set of cells;
    means for determining whether cell-specific reference signals (CRS) from a serving base station is colliding with CRS from each interfering cell of the set of cells; and
    means for computing channel state information (CSI) based on the determined CSE for each cell of the set of cells, wherein the CSI is computed based on the determination of whether CRS from the serving base station is colliding with CRS from each interfering cell of the set of cells.

15. The apparatus of claim 14, further comprising:
means for determining a reference resource for determining the CSE for each cell of the set of cells; and
means for attempting to receive the signals on the reference resource for each cell of the set of cells, wherein the CSE is determined for a cell based on the signals received in the reference resource for the cell.

16. The apparatus of claim 14, further comprising means for determining a reference resource for determining the CSE for each cell of the set of cells based on at least one of a modulation order or coding scheme.

17. The apparatus of claim 14, further comprising means for sending the computed CSE in a payload to a serving base station.

18. The apparatus of claim 14, wherein the CRS from the serving base station is non-colliding with CRS from each interfering cell of the set of cells, and the CSI is computed without performing interference cancelation/suppression of signals received from the set of cells.

19. The apparatus of claim 14, wherein the CRS from the serving base station is colliding with CRS from each interfering cell of the set of cells, and the apparatus further comprises means for applying a weight to the computed CSE for each interfering cell of the set of cells, wherein the CSI is computed based on the weighted CSE for each interfering cell of the set of cells.

20. The apparatus of claim 14, wherein the CRS from the serving base station is colliding with CRS from a first subset of interfering cells of the set of cells and is non-colliding with CRS from a second subset of interfering cells of the set of cells, and the apparatus further comprises means for determining whether to cancel/suppress interference from interfering cells with colliding CRS.

21. An apparatus for wireless communication, comprising:
a memory; and
at least one processor coupled to the memory and configured to:
determine a cancelation/suppression efficiency (CSE) for each cell of a set of cells;
determine whether cell-specific reference signals (CRS) from a serving base station is colliding with CRS from each interfering cell of the set of cells; and
compute channel state information (CSI) based on the determined CSE for each cell of the set of cells, wherein the CSI is computed based on the determination of whether CRS from the serving base station is colliding with CRS from each interfering cell of the set of cells.

22. The apparatus of claim 21, wherein the at least one processor is further configured to:
determine a reference resource for determining the CSE for each cell of the set of cells; and
attempt to receive the signals on the reference resource for each cell of the set of cells, wherein the CSE is determined for a cell based on the signals received in the reference resource for the cell.

23. The apparatus of claim 21, wherein the at least one processor is further configured to determine a reference resource for determining the CSE for each cell of the set of cells based on at least one of a modulation order or coding scheme.

24. The apparatus of claim 21, wherein the at least one processor is further configured to send the computed CSE in a payload to a serving base station.

25. The apparatus of claim 21, wherein the CRS from the serving base station is colliding with CRS from each interfering cell of the set of cells, and wherein the at least one processor is further configured to apply a weight to the computed CSE for each interfering cell of the set of cells, wherein the CSI is computed based on the weighted CSE for each interfering cell of the set of cells.

26. The apparatus of claim 21, wherein the CRS from the serving base station is colliding with CRS from a first subset of interfering cells of the set of cells and is non-colliding with CRS from a second subset of interfering cells of the set of cells, and the at least one processor is further configured to determine whether to cancel/suppress interference from interfering cells with colliding CRS.

27. A non-transitory computer-readable medium storing computer executable code for wireless communication, comprising code for:
determining a cancelation/suppression efficiency (CSE) for each cell of a set of cells;
determining whether cell-specific reference signals (CRS) from a serving base station is colliding with CRS from each interfering cell of the set of cells; and
computing channel state information (CSI) based on the determined CSE for each cell of the set of cells, wherein the CSI is computed based on the determination of whether CRS from the serving base station is colliding with CRS from each interfering cell of the set of cells.

* * * * *